June 8, 1943.  G. W. MORK ET AL  2,321,410
SCRAPER
Filed Dec. 1, 1941

GEORGE W. MORK.
LEO P. BARANOWSKI. INVENTORS
BY
ATTORNEYS

Patented June 8, 1943

2,321,410

UNITED STATES PATENT OFFICE 2,321,410

SCRAPER

George W. Mork, South Milwaukee, and Leo P. Baranowski, Cudahy, Wis., assignors to Bucyrus-Erie Company, South Milwaukee, Wis., a corporation of Delaware Application December 1, 1941, Serial No. 421,210

11 Claims. (Cl. 37—126)

Our invention relates to new and useful improvements in wheeled scrapers of the general type shown and described in U. S. Patent No. 2,198,916, granted April 30, 1940, to Earl B. Maloon, to which patent reference is hereby made, inasmuch as this present invention represents an improvement thereon.

In scrapers of that type, the scraper fills and dumps at its front end.

The main frame of such a scraper is pivoted at either its front end or rear end to a wheeled truck, and the digging and spreading depth is determined by raising or lowering the other end with respect to a second truck. This is the first operating function.

In Maloon and this present invention, the pivoting is at the front end, and the raising and lowering takes place at the rear end; but this, although very advantageous, is not essential.

The digging blade is carried rigid with the main frame, though this is not essential.

Adjacent the digging blade is pivoted a dirt-extruding curved member, variously termed. For conformity with the nomenclature of the Maloon patent, it will here be called a "bucket." Swinging this bucket upward to dump is the second function. Returning this bucket to load-carrying position is the third function.

There is also a front closure, known as the "apron." Opening this apron (when digging or dumping), and closing it again for carrying, is the fourth function.

Maloon has two controls (ropes), one of which performs the first function (namely depth-control), and the other of which successively performs the fourth function (apron opening) and the second function (dumping). For the third function (bowl return), Maloon depends on a kick-back cam, actuated by the fall of the apron.

It is the principal object of our present invention to improve the functioning of the Maloon kick-back cam, and to make some compensating changes in other parts of the structure.

In addition to our principal objects, above stated, we have worked out a number of novel and useful details, which will be radily evident as the description progresses.

Our invention consists in the novel parts and in the combination and arrangement thereof, which are defined in the appended claims, and of which one embodiment is exemplified in the accompanying drawing, which are hereinafter particularly described and explained.

Throughout the description, the same reference number is applied to the same member or to similar members.

Figure 1:
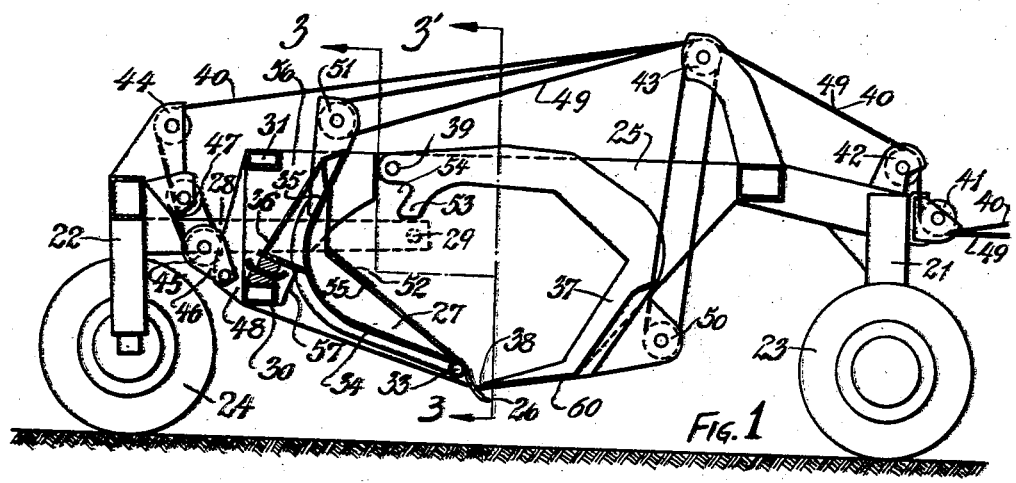
Figures 1 and 2 are vertical longitudinal sections of the scraper of our present invention, in carrying and dumping positions respectively.

Referring now to the figures, we see that the implement to which I have applied my invention, includes a forward truck 21, and a rear truck 22, supported respectively on two forward wheels 23, and four rear wheels 24. The forward truck 21 is rigidly secured to two side plates 25, preferably having substantially the outline indicated in Figures 1 and 2. In place of either such truck, we could support one end of the scraper on the propelling vehicle, such support then constituting one of the ground supports mentioned in our claims.

These parts constitute parts of the frame of the implement, and in accordance with the invention they are connected together in such a way as to enable the scraper blade 26, which is located forward of the bucket 27, to be raised or lowered at will with respect to the ground level. In order to accomplish this, the rear truck 22 is preferably provided with rigid forwardly projecting side arms 28 that extend forwardly to a point about midway between the two trucks, at which point the arms 28 are connected by pivot bolts or pins 29 to the side plates.

Rigidly secured to the side plates 25, we provide a transverse lower beam 30, and an upper beam 31, which latter beam may if desired be made of lighter construction than the lower beam. The inclined scraper blade 26 is preferably rigidly secured to the side plates 25, and cuts into the earth when the bucket 27 is being filled. Adjacent the blade 26 and preferably at its rear edge, the bucket 27 is pivotally mounted on a transverse pivot bar 33. When, in the claims, we state that the digging blade is carried by the main frame, we do not intend to limit this to direct carriage. The blade might, for example, be carried by the bucket forward of its pivot, without departing from the spirit of our invention.

The rear end of the bottom plate 34 of the bucket 27 is preferably bent upwardly to form an integral dished rear head 35 for the bucket.

Figure 2:
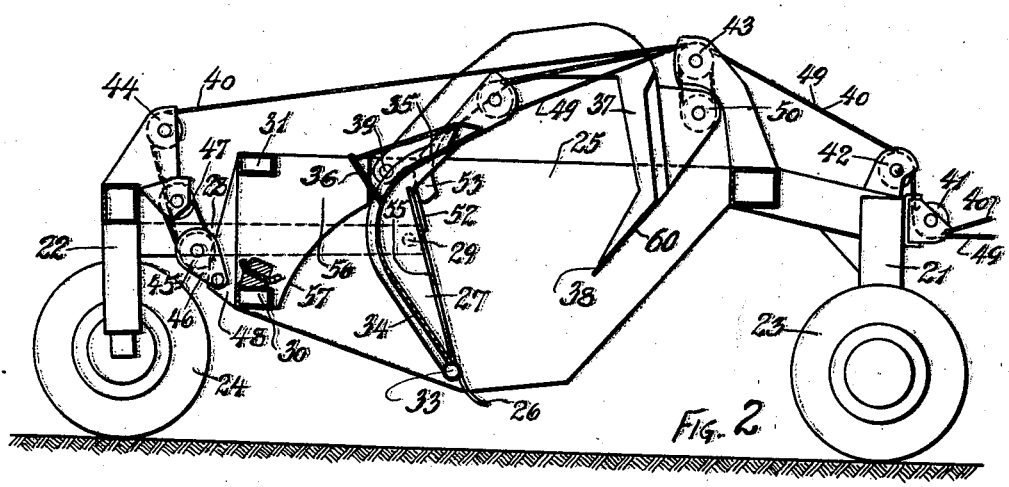

When the bucket 27 is in the position of rest as indicated in Figure 1, the stop bracket 36, carried by the rear end of the bucket, rests against the upper side of the lower beam 30, and this limits the downward movement of the rear end of the bucket.

During the scraping operation with this implement, the blade 26 is held at a low level so as to engage the dirt to be picked up, and the dirt passes over the blade into the bucket. As this takes place, an apron 37 at the forward end of the bucket is held in an elevated position: that is to say, in a partially open position so that as the dirt passes up between the lower edge 38 of the apron 37 and the blade 26, the dirt piling up in the bucket 27 can gravitate into the apron, after which the apron 37 can be moved to a closed position so as to retain the load. The apron is pivotally supported on pivot pins 39. The load-retaining position is shown in Figure 1. The digging position is not shown.

We employ two control cables, the reeving of which will now be described.

Cable 40 controls the first listed function, namely depth control, as in Maloon. It passes, from a winch (not shown) under one of fairlead sheaves 41, over one sheave 42, over one of sheaves 43, over sheave 44 on the rear truck 22, and thence around several sheaves 45 in block 46 and sheaves 47 on the rear truck 22, finally being anchored to either. Block 46 is secured to flanges 48 which are welded to cross-beams 30 and 31 on the main frame.

Rope 49 controls the second listed function, namely dumping, and the fourth listed function, namely apron-opening, as in Maloon. It passes, from the winch, under one of the fairlead sheaves 41, over one of sheaves 42, over one of the sheaves 43, and thence down and around the sheave 50 on the apron 37, back around one of the sheaves 43, thence around the sheave 51 on the bucket 27, and back to an anchorage adjacent sheave 43.

Drawing-in on this rope 49 first draws sheaves 43 and sheave 50 together, thus raising the apron 37 until these sheaves are chock-a-block; thus dumping the contents of the apron. Further drawing-in of this rope 49 then draws sheave 51 and sheaves 43 together, thus pulling the bucket 27 forward to dump its contents.

The forward motion of bucket 27 is limited by the contact of cam-plate 52 carried thereby, with cam 53 carried by the apron.

When rope 49 is released, bucket 27 is practically stalled in a position of unstable equilibrium above its pivot 33, but apron 37 has a long gravity lever-arm about its pivot 39, and hence tends to fall immediately.

As it falls, cam 53 gives a kick to cam-plate 52, thus initiating the return of bucket 27 to carrying position.

Thus far we have described nothing at variance with the showing of Maloon. But now come the novel features of our invention.

The upper portion 35 and preferably the whole side of bucket 27 is set in away from side-plates 25 sufficiently to clear apron 37 and its pivot-pins 39. Cams 53 are spaced forward from pivot-pins 39, and there are reentrant cuts or gaps 54 therebetween. This enables cam-plates 52 to pass ahead of pivot-pins 39 into gaps 54, and enables bucket 27 to tilt beyond pivot-pins 39.

The net effect of all this is to permit locating the apron pivot further to the rear than is possible in Maloon, without thereby interfering with the full dumping of the bucket.

The advantages of this further-to-the-rear positioning of the apron pivots is that it gives the apron a longer lever-arm, thus: (a) giving increased power to its gravity return when rope 49 is released; but more important (b) giving a less tilt to the apron-bottom 60, when the apron is opened slightly during digging, and hence increasing its ability to hold dirt; and still more important (c) giving a greater vertical lift to the apron-lip, for the same width of gap, thereby providing more ground-clearance by the underside of the apron during digging. This last feature is found to be a very marked contribution toward eliminating apron-breakage.

But the offsetting of the sides of the bucket 27 leaves a considerable gap between the side-plates 25 and the back sides of the bucket 27 during digging and carrying. Dirt and rocks can jam in this gap. Accordingly I provide offset plates 56 inside the side-plates 25 to fill the gap between the offset upper portion 35 of the bucket 27 and the side plates 25, and transverse guard plates 55 or other suitable filling means on the sides of the bucket 27 to fill the gap between the lower portion of the bucket and the side plates 25. The lower forward edge 57 of offset plates 56 is a circular arc about pivot 33 as a center and just clears the top edge of guard plates 55 which just clear the top edge of the reentrant cut or gap 54 when the apron is in fully raised position. The space between the curved lower forward edge 57 of the offset plates 56 and the side plates 25 is filled by a curved strip 58.

It should be noted that, although our invention is shown and described as applied to a scraper of the Maloon type, there is no essential relationship between our invention and the use of a single rope 49 to perform both the apron-raising and the dumping functions. It would be equally applicable to a scraper in which these two functions were performed by separate means. Accordingly, when in the claims we refer to "means to thus tilt the bucket and the apron," or similar language, we intend that the word "means" be interpreted alternatively in its singular sense and in its plural sense.

Figure 3:
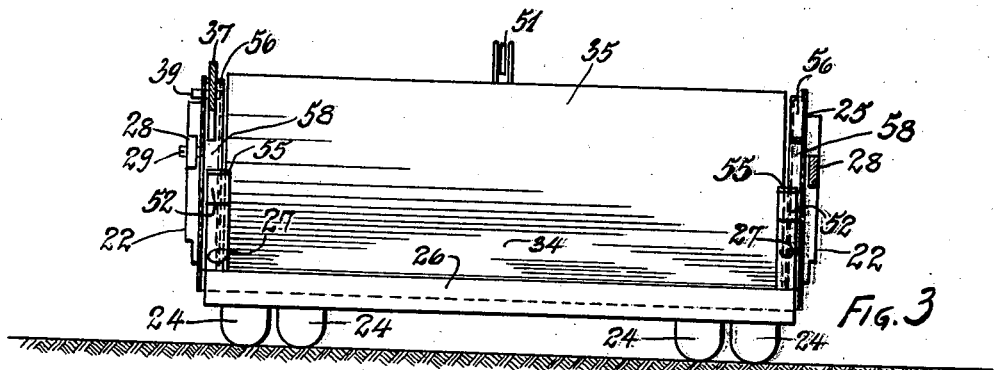
Figure 3 is a vertical transverse section, looking to the rear, taken along the lines 3—3 and 3—3' in Figure 1.

The upper left-hand corner of Figure 3 is taken along the line 3—3', rather than along the line 3—3, and hence shows a section of the arm of the apron 37, rather than a section of offset-plate 56.

Having now described and illustrated one form of our invention, we wish it to be understood that our invention is not to be limited to the specific form or arrangement of parts herein described and shown, except as specifically covered by our claims.

We claim:

1. In a carry type earth-moving scraper, having: ground supports; a main frame, including side plates; a transverse digging blade carried by the main frame, said main frame being capable of being raised and lowered; means for raising and lowering the main frame; a dirt-retaining bucket, pivoted to the main frame adjacent the blade, and capable of tilting forwardly and upwardly to dump; a dirt-retaining apron, pivoted to the main frame at a high rear point thereon; and capable of tilting upwardly to dump; and means to thus tilt the bucket and the apron; there being cam surfaces on the bucket and the apron, which surfaces engage each other when both the bucket and the apron are in fully tilted position, whereby the gravity fall of the apron, when released, initiates the return of the bucket; said scraper being characterized by the cam surfaces on the apron being set forward of the apron pivots, and there being a gap in the apron therebetween, and the upper portion of the bucket being inwardly offset from the side plates of the main frame, whereby, the bucket can clear the apron and its pivots and move forward beyond the pivots.

2. A carry type earth-moving scraper, having: ground supports; a main frame, including side plates; a transverse digging blade carried by the main frame, said main frame being capable of being raised and lowered; means for raising and lowering the main frame; a dirt-retaining bucket, pivoted to the main frame adjacent the blade, and capable of tilting forwardly, and upwardly to dump; a dirt-retaining apron, pivoted to the main frame at a high rear point thereon; and capable of tilting upwardly to dump; and means to thus tilt the bucket and the apron; there being cam surfaces on the bucket and the apron, which surfaces engage each other when both the bucket and the apron are in fully tilted position, whereby the gravity fall of the apron, when released, initiates the return of the bucket; said scraper being characterized by the cam surfaces on the apron being set forward of the apron pivots, and the upper portion of the bucket being inwardly offset from the side plates of the main frame, whereby, the bucket can clear the apron and its pivots and move forward beyond the pivots.

3. In a carry type earth-moving scraper, having: ground supports; a main frame, including side plates; a transverse digging blade carried by the main frame, said main frame being capable of being raised and lowered; means for raising and lowering the main frame; a dirt-retaining bucket, pivoted to the main frame adjacent the blade, and capable of tilting forwardly and upwardly to dump; a dirt-retaining apron, pivoted to the main frame at a high rear point thereon; and capable of tilting upwardly to dump; and means to thus tilt the bucket and the apron; there being cam surfaces on the bucket and the apron, which surfaces engage each other when both the bucket and the apron are in fully tilted position, whereby the gravity fall of the apron, when released, initiates the return of the bucket; said scraper being characterized by the upper portion of the bucket being inwardly offset from the side plates of the main frame, whereby, the bucket can clear the apron and its pivots and move forward beyond the pivots.

4. A scraper according to claim 1, further characterized by having a filler inwardly offset from the side plates of the main frame, to fill the gap between the path of the inwardly offset upper portion of the bucket and the side plates, to the rear of the apron and its pivots.

5. A scraper according to claim 2, further characterized by having a filler inwardly offset from the side plates of the main frame, to fill the gap between the path of the inwardly offset upper portion of the bucket and the side plates, to the rear of the apron and its pivots.

6. A scraper according to claim 3, further characterized by having a filler inwardly offset from the side plates of the main frame, to fill the gap between the path of the inwardly offset upper portion of the bucket and the side plates, to the rear of the apron and its pivots.

7. In a carry type earth-moving scraper, the combination of: a frame; a transverse relatively fixed scraper blade carried by the frame; a bucket pivotally attached adjacent the rear edge of the said blade; an apron pivotally supported on the frame and cooperating with the bucket to support and carry the load; means for raising the bucket and the apron from their load-carrying positions to their dumping positions, said apron constructed so that in its dumping position its center of gravity is substantially out of line with its pivotal connection so that the weight of the apron exerts a force to move the apron toward its depressed position; and cam means between the bucket and the apron enabling the descent of the apron by gravity to exert a force on the bucket to initiate its return by gravity to its working position, a portion of each side of the bucket being offset, so as to enable the bucket to pass forward of the pivots of the apron.

8. In a carry type earth-moving scraper, having: ground supports; a main frame, including side plates; a transverse digging blade carried by the main frame, said main frame being capable of being raised and lowered; means for raising and lowering the main frame; a dirt-retaining bucket, pivoted to the main frame adjacent the blade, and capable of tilting forwardly and upwardly to dump; a dirt-retaining apron, pivoted to the main frame at a high rear point thereon; and capable of tilting upwardly to dump; and means to thus tilt the bucket and the apron; the upper portion of the bucket being inwardly offset from the side plates of the main frame, whereby, the bucket can clear the apron and its pivots and move forward beyond the pivots.

9. A scraper according to claim 1, further characterized by having a filler inwardly offset from the side plates of the main frame; to fill the gap between the path of the inwardly offset upper portion of the bucket and said side plates, and by having a further portion of the bucket inwardly offset from said side plates, and by having outwardly projecting guard means on the sides of the bucket, to fill the gap between the path of said further inwardly offset portion of the bucket and said side plates.

10. A scraper according to claim 2, further characterized by having a filler inwardly offset from the side plates of the main frame, to fill the gap between the path of the inwardly offset upper portion of the bucket and said side plates, and by having a further portion of the bucket inwardly offset from said side plates, and by having outwardly projecting guard means on the sides of the bucket, to fill the gap between the path of said further inwardly offset portion of the bucket and said side plates.

11. A scraper according to claim 3, further characterized by having a filler inwardly offset from the side plates of the main frame, to fill the gap between the path of the inwardly offset upper portion of the bucket and said side plates, and by having a further portion of the bucket inwardly offset from said plates, and by having outwardly projecting guard means on the sides of the bucket, to fill the gap between the path of said further inwardly offset portion of the bucket and said side plates.

GEORGE W. MORK.
LEO P. BARANOWSKI.